United States Patent [19]

Chicoye et al.

[11] 4,068,005
[45] Jan. 10, 1978

[54] ACCELERATED FERMENTATION OF LAGER BEER

[75] Inventors: Etzer Chicoye, Milwaukee, Wis.; J. Raymond Helbert, Waukegan, Ill.; James F. Rice, Milwaukee, Wis.

[73] Assignee: Miller Brewing Company, Milwaukee, Wis.

[21] Appl. No.: 750,509

[22] Filed: Dec. 14, 1976

Related U.S. Application Data

[63] Continuation-in-part of Ser. No. 622,001, Oct. 14, 1975, abandoned.

[51] Int. Cl.$^2$ .............................................. C12C 11/04
[52] U.S. Cl. ........................................ 426/16; 426/11
[58] Field of Search ............................ 426/11, 15, 16

[56] References Cited

U.S. PATENT DOCUMENTS

| | | | |
|---|---|---|---|
| 3,123,475 | 3/1964 | Wondt et al. | 426/16 |
| 3,484,244 | 12/1969 | Kozulis et al. | 426/16 |
| 3,911,139 | 10/1975 | Wolter et al. | 426/16 |

OTHER PUBLICATIONS

Rice et al., The Quantitative Influence of Agitation on Yeast Growth During Fermentation, ASBC Proceedings, 1974, (pp. 94–96).
Hind A. L., Brewing Science and Practice, vol. II, Chapman & Hall, London, 1950, (pp. 679, 783, 784, 785 & 839–847).

*Primary Examiner*—David M. Naff
*Attorney, Agent, or Firm*—Quarles & Brady

[57] ABSTRACT

A method of accelerating the fermentation of a lager-type beer comprises conducting the fermentation at an elevated temperature with or without exogenous agitation while maintaining the dissolved carbon dioxide concentration in the fermentation liquor at a level approximating that found in a fermentation liquor during a normal supersaturated lager-type bottom-fermentation. The level of dissolved carbon dioxide is maintained at about 1.5 to about 2.0 cc per cc of beer by use of an overpressure of 2–20 psig of carbon dioxide.

4 Claims, 3 Drawing Figures

ACCELERATED FERMENTATION OF LAGER BEER

RELATED APPLICATION

This is a continuation-in-part of our copending application Ser. No. 622,001, filed Oct. 14, 1975, now abandoned.

In the specification that follows, attention is directed to various references by number. A list of the references is included at the end of the specification.

BACKGROUND OF THE INVENTION

Historically, there are two general methods of fermenting malt beverages. For the production of ale-type beers, a top-fermentation process is used which utilizes a species of yeast which tends to rise to the top surface of the fermenting wort. The temperature during top-fermentation is conventionally regulated at about 15°–20° C (58°–68° F) throughout the most active period of fermentation. For the production of lager-type beers, a bottom-fermentation process is used which utilizes a species of yeast that remains more or less uniformly suspended throughout the fermenting wort during active fermentation, by natural agitation created by ascending $CO_2$ bubbles (25), then settles to a more or less compact layer on the bottom of the fermentation vessel as fermentation reaches completion. The temperature during a bottom-fermentation is conventionally regulated at about 10°–15° C (50°–58° F) during active fermentation (1, 2).

It is well known that if the temperature during bottom-fermentation is increased, the fermentation can be accelerated and the fermentation time substantially shortened. However, it is also known that the beer so obtained has an undesirable winey flavor which is not typical of a lager-type beer (3–5).

Brewing science literature has documented that this winey off-flavor in high-temperature lager fermentations is related to increased amounts of beer volatile compounds, variously known as fusel (or "higher") alcohols and esters (6–15).

It is further known that vigorous exogenous agitation, that is, agitation added over and above that naturally occurring in commercial fermentors as a result of the normal evolution of $CO_2$ by the fermenting yeast, can substantially reduce the fermentation time of lager beer (4–6, 8, 16). However, it is equally well known that this means of accelerating fermentation has a detrimental effect on the beer flavor which, as in the case with high-temperature accelerated fermentations, is related to an increased level of volatile compounds such as fusel alcohols (4–6, 8, 10, 15–17).

Furthermore, it is well documented that the use of higher temperatures (13, 18, 19) or exogenous agitation (16, 18) during bottom-fermentation results in excessive yeast growth. Thus, the aformentioned techniques, which are generally known to shorten fermentation time, do so with the disadvantages of excessive yeast growth and increased volatiles formation which is deleterious to lager beer flavor.

SUMMARY OF THE INVENTION

It is an object of the present invention to disclose a method of accelerating the fermentation of a lager-type bottom-fermentation beer without the resulting beer having an undesirable winey flavor not normally associated with lager beer.

This and other objects will be apparent from the description which follows.

DESCRIPTION OF THE PREFERRED EMBODIMENT

Figure 1:
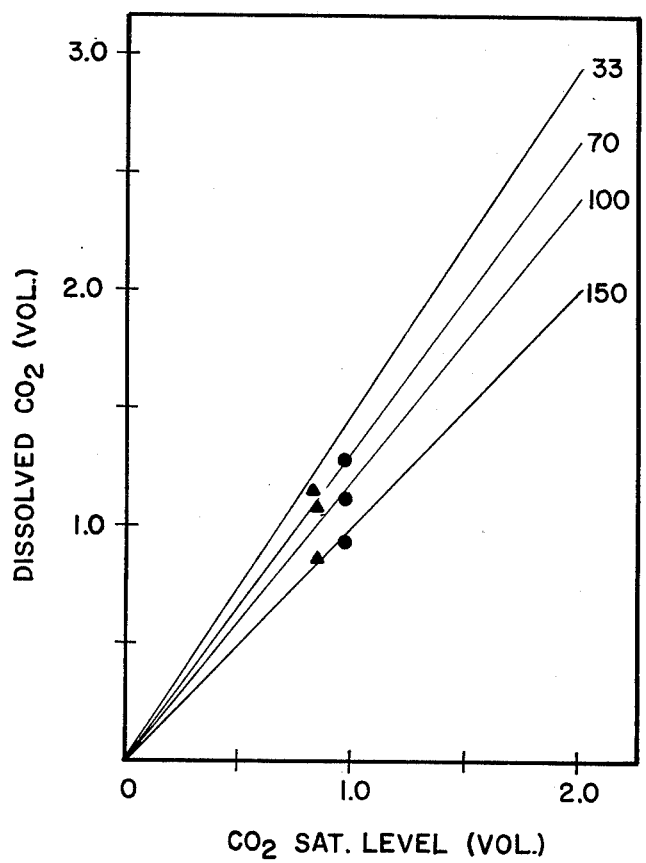

It is known that fermenting beer is supersaturated with $CO_2$ uniformly throughout the body of fermenting beer during the active phase of conventional lager fermentations (24–26). It is also known that vigorous exogenous agitation eliminates this $CO_2$ supersaturation (24). In our laboratories we have discovered that this supersaturation is maintained quite constant throughout the active period of fermentation (22). We also have found that there is a direct relationship between the level of exogenous agitation and the degree of $CO_2$ supersaturation maintained during lager fermentations (22). While there are references in the literature (20, 21) that $CO_2$ overpressure represses yeast growth, we have discovered that it is not the $CO_2$ pressure as such, but the dissolved $CO_2$ concentration in the fermenting liquid which determines the extent of growth repression (22).

We have discovered that if we maintain the concentration of the dissolved $CO_2$ in the fermentation liquid at a level approximating that found in a fermentation conducted at normal conditions for a lager-type beer fermentation, we can employ temperatures higher than those normally employed in bottom-type fermentations to obtain a lager beer without an undesirably winey flavor. In order to maintain the desired level of dissolved $CO_2$, we have found that as the temperature is increased, it is necessary to employ an increased overpressure of carbon dioxide. Preferably the overpressure is such that the dissolved $CO_2$ level is maintained at about 1.5 to about 2.0 cc per cc of fermentation liquid. In the practice of the invention we have found that the combination of temperatures of 60°–85° F, and appropriate carbon dioxide overpressures of 2–20 psig will maintain the dissolved carbon dioxide at the desired level and permit the fermentation to be completed in 50 to 175 hours. Especially preferred is the combination of temperatures of 60°–75° F and appropriate $CO_2$ overpressures of 2–12 psig which maintains the dissolved $CO_2$ concentration at the desired level and permits the fermentation to be completed in about 100 hours.

The proper choice of $CO_2$ overpressure requires knowledge of the influence of both temperature and $CO_2$ overpressure upon the degree of $CO_2$ supersaturation which prevails during the active phase of lager fermentations. We have discovered the quantitative relationships of these fermentation parameters of temperature and $CO_2$ overpressure upon the level of $CO_2$ supersaturation, and thus we can calculate the $CO_2$ overpressure necessary to establish the desired dissolved $CO_2$ concentration during a fermentation at any temperature within the range of at least 57° to 72° F.

We have further related the influence of the fermentation parameters of $CO_2$ overpressure, temperature, and exogenous agitation level upon the dissolved $CO_2$ concentration in lager fermentations.

We have found that, while the dissolved $CO_2$ concentration during active fermentation is influenced by both $CO_2$ overpressure and fermentation temperature, the supersaturation is constant, regardless of the fermentation temperature or $CO_2$ overpressure (at least within the range examined; 57°–72° F, and 0–16 psig respectively). The dissolved $CO_2$ concentration is, of course, influenced inversely by temperature and directly by pressure. The dissolved $CO_2$ concentration at saturation for a wide range of temperature and $CO_2$ pressure conditions is available in the literature (27). The dissolved $CO_2$ level actually present in the fermentation is proportionately greater because of supersaturation, and it is this degree of supersaturation which is constant regardless of temperature or $CO_2$ pressure. This is shown graphically in FIG. 1.

Figure 2:
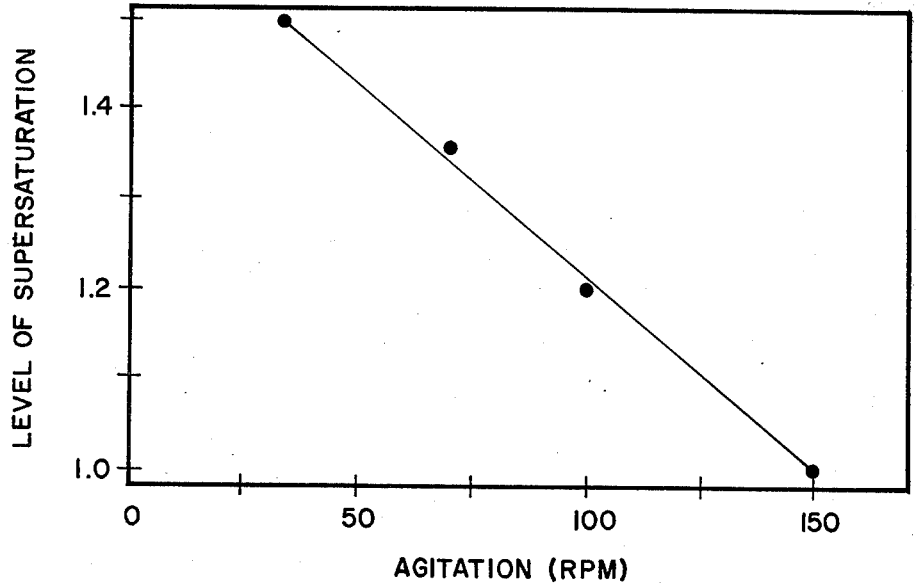

We have discovered that the degree of agitation controls the level of supersaturation and that there is a direct linear relationship between the degree of supersaturation and agitation as shown in FIG. 2.

Thus, using the quantitative relationships we have discovered, it is possible to accurately predict the effect of altering any of three fermentation parameters—$CO_2$ overpressure, temperature, and agitation upon the dissolved $CO_2$ concentration prevailing during fermentation. For example, if it is desired to shorten fermentation time by use of exogenous agitation, we can predict the effect of the selected level of agitation upon supersaturation, and thus we are able to calculate the $CO_2$ overpressure required to adjust the dissolved $CO_2$ concentration during the fermentation to the level which normally exists in a conventional lager fermentation.

There is increasing use of large, very deep fermenting tanks in the brewing industry. The volatiles concentration is frequently less in the beer from these tanks than occurs in a conventionally fermented lager beer (7). This is a result of excessive dissolved $CO_2$ due to the much greater tank depth—often five times as deep as conventional lager fermentors. This increased dissolved $CO_2$ concentration overrepresses yeast growth and concomitantly volatiles formation. Utilizing the quantitative relationships we have developed, the normal level of dissolved $CO_2$ can be established by applying either the proper degree of exogenous agitation or temperature increase, or both. This, as we have demonstrated will result in the proper amount of yeast growth and volatiles concentration. A further benefit will be shortened fermentation time, due to the accelerating effects of both agitation and increased temperature.

The necessary $CO_2$ overpressure required to maintain the dissolved $CO_2$ level in the fermentation liquid at the desired level can be calculated by the following formula in which the rate of agitation approximates agitation caused by the natural evolution of carbon dioxide:

Dissolved $CO_2$ during fermentation = 1.5 × dissolved $CO_2$ at saturation.

Thus, by dividing the desired dissolved $CO_2$ concentration during fermentation by 1.5, the saturation level of dissolved $CO_2$ is determined. With both the fermentation temperature and the saturation level of dissolved $CO_2$ known, the required $CO_2$ overpressure is obtained from either the literature (27) or FIG. 1, at 33 rpm. Since the effect of the level of agitation upon supersaturation is known, these conditions of temperature and $CO_2$ overpressure will result in the desired $CO_2$ level.

A series of fermentations were run to demonstrate the utility and effectiveness of the invention. The fermentation vessel used in the experiments was a 130-liter stainless steel vessel with a working capacity of 100 liters, cylindrical, about 33 inches high and 17 inches inside diameter. It was equipped in conventional fashion, i.e., with pressure cap, temperature and pressure gauges, vapor inlet and exit lines, and liquid discharge spigot at the bottom. It was provided with an external cooling-/heating jacket and with turbine-type impellers and baffles. The arrangement permitted precise control of agitation, temperature, and headspace pressure over a wide range.

The concentration of volatile components of fermented beers was determined by conventional gas chromatographic techniques, either by analyzing headspace gas above an enclosed sample (see "Gas Liquid Chromatography (GLC) Tests", infra) or by analyzing a carbon disulfide extract of the beer. The yeast concentration was determined both by cell count with a haemocytomer and by dry weight determination of the centrifuged yeast. The completion of a fermentation was determined by two widely accepted criteria: the decrease of diacetyl concentration to 0.10 ppm, estimated by U.V. spectrophotometry, and by the disappearance of fermentable sugars, estimated by high pressure liquid chromatography.

A series of fermentations, Examples 1–7, were run in the aforesaid 100-liter fermentor employing a conventional commercial wort, i.e., a 14.1 Plato wort which was prepared using a 55/45 malt-adjunct ratio, with the adjunct being 65% commercial corn grits and 35% commercial brewers' syrup.

GENERAL PROCEDURE USED IN EXAMPLES

The conventional commercial wort, both aerated and pitched with lager yeast in production equipment in the conventional manner, was aseptically transferred from a 1000-barrel commercial fermentor to the $CO_2$-packed, 100-liter fermentor 20 hours after pitching. This assured that the procedures prior to fermentation did not deviate from conventional commercial practice. The 20-hour residence in the commercial fermentor prior to transfer corresponds approximatey to the yeast lag phase, during which little yeast growth takes place, but during which the oxygen, added during aeration, is absorbed, preparatory to growth. If this delay in transfer had not been used, $CO_2$ pressurizing in the 100-liter fermentor would have had to be delayed to assure this oxygen absorption.

Agitation was maintained at 33 rpm in the 2-foot deep, 100-liter fermentor, since it has been previously established that this mixing speed duplicated the agitation conditions normally occurring as a result of $CO_2$ evolution by yeast during fermentation in our 8-foot deep commercial fermentors.

Fermentation was judged completed when both carbohydrate assimilation ceased (at an acceptably low residual level) and diacetyl concentration decreased to 0.10 parts per million. Both of these conditions are conventional criteria of the final completion of lager fermentation.

At the completion of fermentation, the raw beer was withdrawn, clarified, and bottled, and analyzed as described elsewhere.

The following examples illustrate without limiting the invention.

EXAMPLE 1

This example is a control. In it, conventional fermentation conditions are used. These conditions give an acceptable raw beer. Note that a total of 196 hours were required to complete the fermentation.

One hundred liters of the conventional wort, aerated and pitched at about 10 million cells/cc, were fermented at a constant 57° F with low level agitation (33 rpm) and no $CO_2$ overpressure. The yeast concentration reached a maximum of 5.77 grams/liter (dry weight basis) and 60 million cells/cc. About 160 hours were required to ferment the available carbohydrates and an additional 36 hours (approximately) were required to reduce diacetyl to 0.10 ppm. The volatiles concentration expressed as the total area of the component peaks from the gas-liquid-chromatographic (GLC) analyses, relative to the peak area of an internal standard taken as 100, was 904 (by analyzing $CS_2$ extract of the beer) and 648 (by analyzing headspace vapors over the beer).

EXAMPLE 2

This example is another control. It is like Example 1, except that the temperature was increased to 72° F, to determine whether the increased temperature would shorten fermentation time while giving an acceptable product. As shown, the time was decreased, but the product was unacceptable.

One hundred liters of the conventional wort, aerated and pitched at about 10 million cells/cc, were fermented at a constant 72° F with low level agitation (33 rpm) and no $CO_2$ overpressure. The maximum yeast concentration reached 6.03 grams/liter (dry weight basis) and 69 million cells/cc. About 90 hours were required to decrease the diacetyl to 0.10 ppm and another 10 hours were required to complete fermentation of the available carbohydrates, for a total of 100 hours. Volatiles content, as total relative to GLC peak area, was 956 ($CS_2$ extract) and 752 (headspace) compared to the internal standard of 100. The data in the table show that the high temperature of Example 2 decreased the fermentation time but increased the volatiles content, relative to Example 1.

EXAMPLE 3

One hundred liters of the conventional wort, aerated and pitched at about 10 million cells/cc, were fermented at a constant 72° F, 33 rpm agitation, and 14.9 psig $CO_2$ overpressure. The yeast concentration reached a maximum of 5.37 grams/liter (dry weight basis) and 53 million cells/cc. Ninety hours were required to assimilate all fermentable sugars and another 5 hours (for a total of 95 hours) to reduce diacetyl to 0.10 ppm. Volatiles content, as total relative GLC peak area, was 820 ($CS_2$ extract) and 298 (headspace). Example 3 demonstrates that in the presence of about 15 psig $CO_2$ overpressure the volatiles formation normally accompanying a fermentation run at this temperature has been overrepressed without altering the accelerated fermentation rate.

EXAMPLE 4

This example is another control and the conditions of this fermentation were designed to duplicate conventional commercial lager fermentation characteristics and the characteristics of the resultant raw beer.

One-hundred liters of the aforementioned commercial wort, handled in the manner previously described, were fermented at a constant 59° F, with no $CO_2$ overpressure. A constant low level (33 rpm) of agitation was applied to duplicate natural agitation conditions in the commercial fermentor. The dissolved $CO_2$ concentration in the fermentation liquid was 1.52 cc of $CO_2$ per cc of liquid.

About 172 hours were required to decrease diacetyl to 0.10 ppm and an additional 6 hours were required to complete fermentation of available carbohydrates. Thus a total of 178 hours (7.4 days) was required to reach the end of fermentation using the criteria previously described.

Yeast concentration reached a maximum of 5.9 grams/liter (dry weight basis) and 58 million cells/cc. The total volatiles concentration, as determined by gas-liquid chromatography, was 872, relative to the reference standard used in the analytical method.

The fermentation time required and yeast growth and volatiles concentration are typical of our raw lager beer.

EXAMPLE 5

The conditions of this fermentation were designed to demonstrate the influence of fermenting at a temperature greatly in excess of normal lager practice.

One-hundred liters of the aforementioned commercial wort, handled in a manner previously described, were fermented at 72° F with no $CO_2$ overpressure. A constant agitation of 33 rpm was applied to duplicate agitation conditions occurring naturally in the commercial fermentor. The dissolved $CO_2$ concentration in the fermentation liquid was 1.30 cc of $CO_2$ per cc of liquid.

About 85 hours were required to ferment the available carbohydrates and another 4 hours to decrease diacetyl to 0.10 ppm. Thus the total fermentation time, based on the previously described criteria, was 89 hours (3.7 days).

Yeast growth reached a maximum of 6.45 grams/liter dry weight and 77 million cells/cc. Total volatiles concentration, relative to the GLC reference standard, was 950.

Thus while the increased fermentation temperature shortened the time required for fermentation by 50%, the yeast growth and the volatiles concentration were increased to a level substantially in excess of our raw lager beer.

EXAMPLE 6

The conditions of this fermentation embody our invention. It is designed to demonstrate that with the use of the proper level of $CO_2$ overpressure, the desired dissolved $CO_2$ concentration can be maintained and a fermentation can be run at a temperature far in excess of accepted lager fermentation practice, without the usual deleterious effects of excessive yeast growth and volatiles formation of a high-temperature fermentation, while still achieving the shortened fermentation time resulting from the increased temperature.

One-hundred liters of the aforementioned commercial wort, handles as previously described, were fermented at a constant 72° F, and a constant $CO_2$ overpressure of 8 psig. A constant agitation level of 33 rpm was used to duplicate the agitation conditions occurring naturally through $CO_2$ evolution in the commercial fermentors. The dissolved $CO_2$ concentration of the liquid was 1.88 cc of $CO_2$ per cc of fermentation liquid.

About 93 hours were required to decrease diacetyl to 0.10 ppm and another 2 hours were required to complete fermentation of available carbohydrates. Thus a total of 95 hours (4.0 days) was required to reach the end of fermentation, based upon the criteria previously described.

Yeast growth reached a maximum of 5.9 grams/liter, dry weight and 59 million cells/cc. The total volatiles concentration, relative to the GLC reference standard, was 820.

Thus the application of the proper $CO_2$ overpressure at this elevated temperature repressed both yeast growth and volatiles formation such that they were typical of our conventional raw lager beer as found in Example 4, while maintaining the decreased fermentation time of the high-temperature fermentation of Example 5.

EXAMPLE 7

The conditions of this fermentation were designed to demonstrate our discovery that the repression of both yeast growth and volatiles formation are directly related to the dissolved $CO_2$ concentration which is effected by the amount of $CO_2$ overpressure applied.

One-hundred liters of the aforementioned commercial wort, handled in the manner previously described, were fermented at a constant 72° F with a constant $CO_2$ overpressure of 14. A constant agitation level of 33 rpm was maintained, as previously described. The dissolved $CO_2$ concentration of the liquid was 2.35 cc of $CO_2$ per cc of beer.

A total of 102 hours (4.25 days) was required to reach the end of fermentation, based upon the criteria previously described.

Yeast growth reached a maximum of 5.5 grams/liter, dry weight, while total volatiles concentration, relative to the GLC reference standard, was 667. As a result of the low volatile concentration the flavor was unacceptably bland for a typical lager beer.

Thus, the application of excessive $CO_2$ overpressure at this elevated temperature overly repressed both yeast growth and volatiles formation, as compared to Example 4, which exemplifies a conventional lager fermentation and raw beer. The decreased fermentation time was typical of this temperature.

The pertinent data for the fermentations described in Examples 4-7 is shown in Table I.

Note that in all examples run at the elevated temperature of 72° F, the total fermentation time (the longest time taken for satisfying the two criteria of end of fermentation) was far less than in Example 4, run at the lager fermentation temperature of 59° F.

Figure 3:
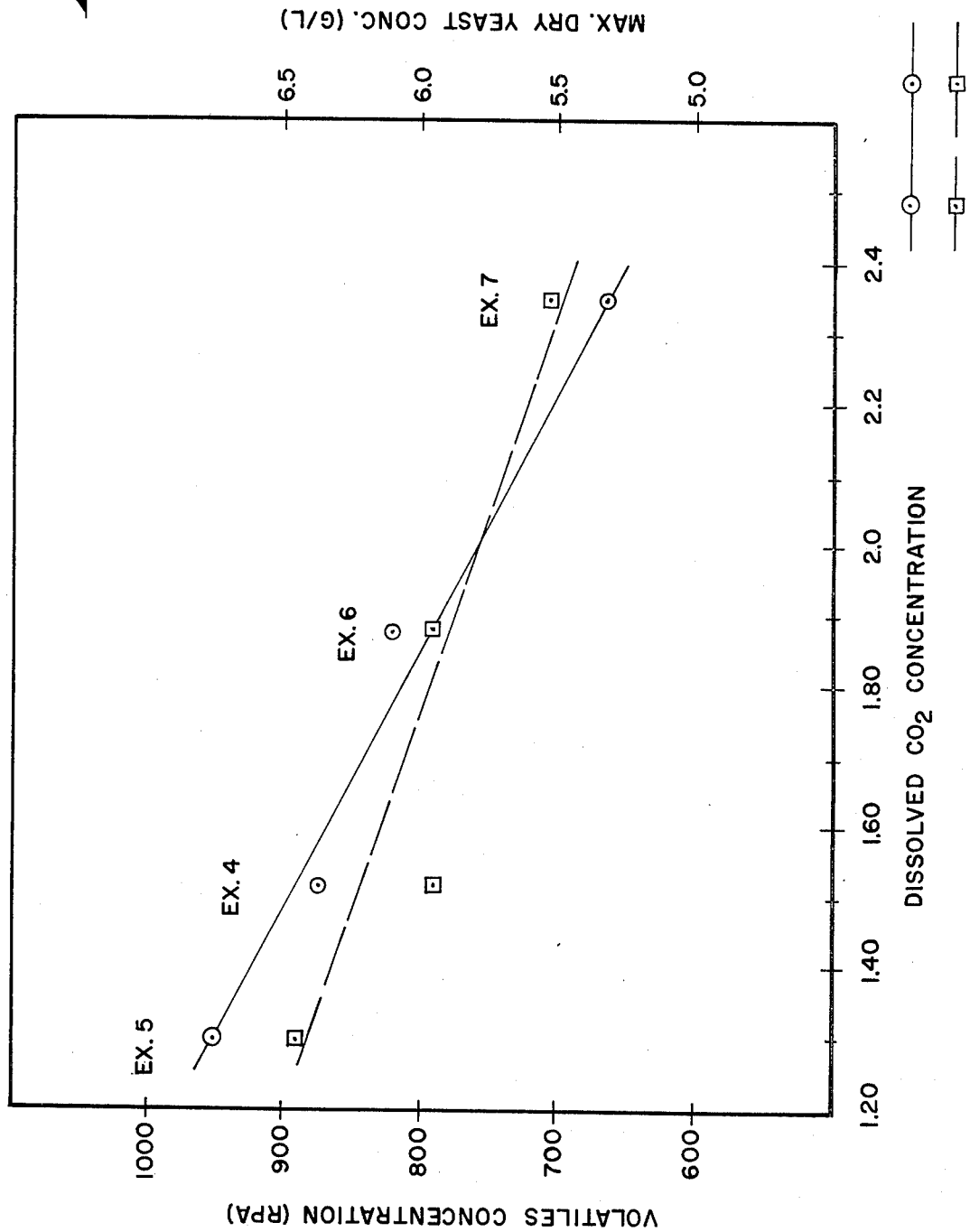

Note the inverse relationship between the dissolved $CO_2$ concentration and both the maximum yeast growth and the volatiles concentration. The data is graphically presented in FIG. 3. Thus, the greater the dissolved $CO_2$ concentration, the less the maximum yeast growth and the volatiles concentration. Note that this relationship is true of dissolved $CO_2$ concentration in all cases and not of the level of $CO_2$ overpressure. This demonstrates the validity of our discovery that it is the level of dissolved $CO_2$ which is paramount in controlling yeast growth and volatiles concentration; $CO_2$ overpressure is the means of adjusting the dissolved $CO_2$ concentration to the requisite level.

Knowledge of the influence of fermentation temperature, agitation, and $CO_2$ overpressure upon dissolved $CO_2$ levels under supersaturated conditions is important for determining the level of $CO_2$ overpressure necessry for properly repressing yeast growth and volatiles formation to the amounts prevailing in the conventional lager fermentation.

TABLE I

| Examples | 4 | 5 | 6 | 7 |
|---|---|---|---|---|
| Temperature (° F) | 59 | 72 | 72 | 72 |
| Agitation (rpm) | 33 | 33 | 33 | 33 |
| $CIO_2$ Pressure (psig) | 0 | 0 | 8 | 14 |
| Yeast Dry Weight (g/l) | 5.9 | 6.45 | 5.9 | 5.52 |
| Dissolved $CO_2$ Concentration (cc/cc beer)* | 1.52 | 1.30 | 1.88 | 2.35 |
| Fermentation End of Sugar Assimilation | 178 | 85 | 95 | 80 |
| Time (hours) to 0.10 ppm Diacetyl | 172 | 89 | 93 | 102 |
| Total Volatiles (Relative GLC Peal Area**) | 872 | 950 | 820 | 667 |

*Value prevailing during active fermentation.
**Area relative to internal standard as 100.

A $CO_2$ overpressure as low as 2 psig used in conjunction with an appropriately elevated temperature (within the scope of this invention) will have the beneficial result of producing an acceptable beer, while reducing fermentation time. $CO_2$ overpressures in excess of this lower limit are likewise suitable, and will depend upon the temperature being employed assuming the rate of agitation is constant. Generally overpressures in the range of 2-20 psig are preferred.

The $CO_2$ overpressure is preferably added at the end of the yeast lag phase. Additionally, and/or as a partial alternate, the $CO_2$ overpressure used can suitably be in part that normally and autogenously developed during the fermentation. It is retained within the vessel and in the overhead space, but may be vented continuously or from time to time if desired, while retaining the desired overpressure.

The $CO_2$ overpressure on the face of the fermenting liquid, of course, results in an increase in dissolved $CO_2$ concentration in the body of the liquid, and it is this dissolved $CO_2$ which provides the beneficial effects.

Conventional fermentation temperatures for lager-type beers in the United States run typically in the range of 54°-57° F. We know from our work that an increase in $CO_2$ concentration or the use of $CO_2$ overpressures will not reduce fermentation times when used with such temperatures. Thus, we recommend temperatures at least as high as 60° F. Temperatures as high as 85° F can be used. Thus, our broad operative temperature range is 60°-85° F. We prefer, however, to use a temperature within the narrower range of 60°-75° F.

These higher temperatures must be accompanied by $CO_2$ overpressures to maintain the dissolved $CO_2$ concentration at the desired levels of 1.5 to 2.0 cc of $CO_2$ per cc of beer. Otherwise, the beer will have a winey and/or estery taste and flavor.

The fermentation process is exothermic, and the fermenting liquor will warm up. In conventional fermentations, this heat is removed by refrigeration. In the instant invention refrigeration may still be found desirable, but only for the purpose of keeping the fermenting wort within the higher temperature range. In other words, not as much heat is taken out in our process as in conventional fermentations. On the other hand, external heat may be applied if circumstances require.

The upper temperature limit is the temperature at which the yeast metabolism is significantly altered. Depending on conditions, this temperature may be around 85° F.

It is an object of the invention to decrease fermentation time. In accomplishing this by increasing fermentation temperature and maintaining the dissolved $CO_2$ concentration at the desired level by $CO_2$ overpressure, we do not aim so much at a specific time as at a reduction in the time that would ordinarily be required if our invention were not used. Thus, in a fermentation that might ordinarily require 8 days to complete, the use of our invention could be expected to reduce fermentation time to 4-5 days. On the other hand, a 10-day fermentation might be reduced to 5-6 days, and so on. The reason for the variation is, of course, the variation in fermentation equipment, wort characteristics, brewhouse schedules, and so on. Generally, however, the use of our invention will reduce fermentation time for a given set of condtions by 25-75%, more or less. Normally a fermentation employing our invention will be complete in 50 to 175 hours. This time saving has the effect of multiplying the capacity of the equipment by the said percentage factor, obviously with a concomitant saving in the cost of capital equipment.

COMPLETION OF FERMENTATION; PRODUCT EXAMINATION

Conventional techniques were used to determine completion of fermentation, viz., disappearance of sugars and disappearance of diacetyl. Diacetyl is an undesirable buttery-tasting material which is initially formed by the fermentation process. It reaches a peak, then gradually disappears. Amounts in excess of 0.10 ppm are generally considered objectionable in most breweries, and, therefore, the fermentation is continued at least to approximately this end point. Thus, the fermentation is not considered complete until the last to occur of two events, (a) sugar disappearance and (b) diacetyl drops to about 0.10 ppm. Comment: the value of 0.10 ppm cannot by any means be considered critical. It may be somewhat higher or lower, depending on local brewing practice. The value is, however, typical, and we prefer it.

Completion of fermentation does not necessarily mean that the product is a good beer. Thus, in Example 2, completion of fermentation gave a beer with an excessive amount of higher alcohols and higher esters. (Note volatiles of 956 in the $CS_2$ extract.) Such beers usually have a winey character. And, as a matter of fact, we have been able to show in many cases that such alcohols and esters are present in runs like those of Example 2 in quantities higher than those of conventional fermentations and those of the instant invention. Such analyses have been made by techniques standardized in the laboratories of The Miller Brewing Company and involve extraction using $CS_2$, and gas-liquid chromatography, as described elsewhere herein. The quantity extracted in a given fermentation product is compared with a norm previously established as a suitable standard. The runs made using this invention generally give values that do not exceed this norm. However, it is difficult if not impossible to state any given limits for volatiles (i.e., higher alcohols and esters, etc.) for any given run. Although the ultimate test is taste, as determined by an experienced and competent taste panel, GLC data are known to correlate well with panel data, and are more readily accessible. Our conditions of temperature and $CO_2$ overpressure as above stated will inherently give a beer product that will provide suitable taste as determined by such a panel.

The higher alcohols and higher esters above referred to ("winey" or "estery" materials) are known by various names, e.g. volatiles, fusel oils, etc. They are tolerated or may even be useful in ales or wines, but in general, they are desirably minimized in lager beer. Among these materials we have identified n-propyl, iso-butyl, iso-amyl, and phenethyl alcohols; ethyl, iso-propyl, iso-amyl and phenethyl acetates; acetaldehyde; and ethyl propanoate, hexanoate, and octanoate. Additionally, there are several unknowns that we have not identified. In the aggregate, the formation of these materials is suppressed in fermentations at the higher temperatures of this invention by maintaining the level of dissolved $CO_2$ in the range herein described. Iso-amyl alcohol and ethyl acetate are apparently the major components of these volatiles. The quantities of both are strongly suppressed by use of $CO_2$ overpressure, although they both still remain the major components of the resulting volatiles.

After fermentaion is complete, the green (raw) beer product is recovered and finished by conventional procedures.

GAS LIQUID CHROMATOGRAPHY (GLC) TESTS

These tests (for "winey" higher esters and higher alcohols) are designed to establish that in the practice of this invention these substances approximate (or at least do not exceed) in kind and amount, like materials in beer brewed by standard processes.

The basic test technique is well known, and for our purposes certain modifications have been introduced in view of the particular compounds to be identified. For example, the identifying "artifact" must be selected so that it falls in a valley between peaks of known components. For examination of headspace volatiles, for example, a suitable artifact is m-xylene, which falls between iso-amyl alcohols and iso-amyl acetate.

The gas chromatograph used was a Hewlett-Packard, Series 7621A with dual flame ionization detectors. A temperature of 270° C was used for both the detector and injector. A dual column was used, 10 ft. by ⅛ inch stainless steel, packed with 80-100 mesh Porapak Q (a commercially available sorbent). Nitrogen was used as the carrier gas, at an inlet pressure of 78 psi and a flow rate of 55 ml/min.

PREPARATION OF SAMPLE FOR INJECTION

After chilling for 1 hour at 0° C 50 mls. of beer are gently measured and poured into a 7 oz. beer bottle containing 20 gm. of anhydrous sodium sulfate (to aid in "salting out" the vapors). A Neoprene crown insert is placed over the top and the bottle is crowned with a beer cap (insert removed) which has a small hole for sampling purposes. 10 ml. of a standard m-xylene solution (1 ml. diluted to 100 mls, with 95% ethanol) is added. The sample is warmed in a 50° C water bath for 10 min., shaken 30 sec., and kept at 50° C for 20 min. The bath is then cooled to 25° C (10-15 min.). The sample is then kept in the dark overnight at 25° C to equilibrate. Two individual samples of the same beer comprise a replicate analysis. An 8 ml. vapor sample is obtained in a 10 ml. gas tight syringe (after gently pumping five times) by drawing in 9 ml. and expelling 1 ml. The sample is then injected into the chromatograph inlet.

The apparatus automatically prints out a chromatogram showing the individual components as peaks. The area under a given peak is proportional to the quantity of the component. For a more exact estimation, the area can be compared to the area of the artifact, for that amount is, of course, exactly shown.

While in the foregoing description we have described examples utilizing specific conditions, it is to be understood that maintaining the dissolved $CO_2$ concentration at the desired levels in the beer under accelerated fermentation conditions by varying the temperature, the agitation or the $CO_2$ overpressure during fermentation is within the spirit and scope of our invention.

REFERENCES

1. DeClerck, J., "A Textbook of Brewing", Chapman and Hall, Ltd., London, 1957, Vol. 1, Chaps. 18 and 20.
2. Hind, H. L., "Brewing Science and Practice", Chapman and Hall, Ltd., London, 1950, Vol. 2, Chaps. 32-34.
3. Lewis, M. J., *Tech. Quart. Master Brew. Ass. Amer.*, 11(4), xiii-xiv (1974).
4. Pajunen, E., and Makinen, V., *Eur. Brew. Conv., Proc. Congr.* 15th, *Nice,* 1975, p. 525.
5. Hellich, P., *Eur. Brew. Conv., Proc. Congr.* 15th, *Nice,* 1975, p. 511.
6. Enari T.-M., et al., *Tech Quart. Master Brew. Ass. Amer.*, 7(1), 11 (1970).
7. Van Gheluwe, G., et al., *Tech. Quart. Master Brew. Ass. Amer.*, 12(3), 169 (1975).
8. Engan, S., *Brewers Digest,* Aug. 1974, p. 52.
9. Nordström, K., *Eur. Brew. Conv., Proc. Congr.* 10th, *Stockholm,* 1965, p. 195.
10. Thorne, R. S. W., *Tech. Quart. Master Brew. Ass. Amer.*, 3(2), 160 (1966).
11. Gracheva, J. M., et al., *Mikrobiologiya,* 39(2), 322 (1970).
12. Bavisotto, V. S., et al., *Amer. Soc. Brew. Chem.,* Proc. 1961, p. 16.
13. Äyräpää, T., *Brauwiss.,* 23(2), 48 (1970).
14. Kamiyama, S., and Nakagawa, A., *Brewers Digest,* Feb. 1968, p. 60.
15. Szlavko, C. M., *J. Inst. Brew.,* 79, 283 (1973).
16. Haboucha, J., et al., *Eur. Brew. Conv., Proc. Cong.* 11th, *Madrid,* 1967, p. 197.
17. McFarlane, W. D., and Millingen, M. B., *Amer. Soc. Brew. Chem. Proc.,* 1964, p. 41.
18. Lie, S., *Eur. Brew. Conv., Proc. Cong.* 10th, *Stockholm,* 1965, p. 292.
19. Lie, S., and Haukeli, A., *Eur. Brew. Conv., Proc. Cong.* 14th, *Salzburg,* 1973, p. 285.
20. Schmitthenner, F., *Weinbau. Wiss. Beih.,* 3, 147, (1949).
21. Drews, B., et al., *Brauerei, Wissensch. Beil.,* 7, 111, (1954).
22. Rice, J. F., Helbert, J. R., and Garver, J. C., *Amer. Soc. Brew. Chem.,* Proc. 1974, p. 94 (Published Nov. 5, 1974).
23. Delente, J., Akin, C., Krabbe, E., and Ladenburg, K., *Biotechnol. & Bioeng.,* 9, 631 (1969).
24. Delente, J., and Gurley, J., *Tech. Quart. Master Brew. Assn. Amer.,* 5(3), 187 (1968).
25. Trolle, B., *J. Inst. Brew.,* 56, 364 (1950).
26. Akin, C., and Krabbe, E., *Amer. Soc. Brew. Chem.,* Proc. 1966, p. 86.
27. *Amer. Soc. of Brewing Chemists,* Methods of Analysis (6th Ed.). Beer - 13, p. 48 (1958).

We claim:

1. The method of reducing the length of time required for a bottom fermentation to produce a lager beer which comprises placing beer wort in a fermentation vessel and fermenting the wort in said vessel with yeast for about 50 to about 175 hours at an elevated temperature of 60° F to about 85° F while maintaining the dissolved $CO_2$ concentration in the fermenting wort at about 1.5 to about 2.0 cc per cc of the fermenting wart by use of a $CO_2$ overpressure in the vessel of about 2 to about 20 psig.

2. The method of claim 1 in which the temperature is 60° F to about 75° F and the $CO_2$ overpressure is about 2 to about 12 psig.

3. The method of claim 1 in which the temperature is about 72° F and the $CO_2$ overpressure is about 8 psig.

4. The method of claim 1 in which as the temperature is increased, the overpressure of $CO_2$ is also increased to maintain the dissolved $CO_2$ concentration at the desired level.

* * * * *

UNITED STATES PATENT OFFICE
CERTIFICATE OF CORRECTION

Patent No. 4,068,005   Dated January 10, 1978

Inventor(s) Etzer Chicoye, J. Raymond Helbert and James F. Rice

It is certified that error appears in the above-identified patent and that said Letters Patent are hereby corrected as shown below:

Column 6, line 48, change "handles" to --handled--.

Column 7, line 64, change "CIO$_2$" to --CO$_2$--.

Column 10, line 61, change "shown" to --known--.

Column 12, line 28, change "wart" to --wort--.

Signed and Sealed this

Eighteenth Day of April 1978

[SEAL]

Attest:

RUTH C. MASON
Attesting Officer

LUTRELLE F. PARKER
Acting Commissioner of Patents and Trademarks